United States Patent [19]

Pruitt

[11] Patent Number: 5,740,236
[45] Date of Patent: Apr. 14, 1998

[54] SYSTEM FOR PROVIDING FEATURE SERVICES IN A TELECOMMUNICATIONS SYSTEM

[75] Inventor: Leonard Eugene Pruitt, The Colony, Tex.

[73] Assignee: Ericsson, Inc., Research Triangle PK., N.C.

[21] Appl. No.: 576,510

[22] Filed: Dec. 21, 1995

[51] Int. Cl.$^6$ ...................................................... H04M 3/42
[52] U.S. Cl. ........................ 379/201; 379/112; 379/207; 379/230; 379/244
[58] Field of Search ........................... 379/201, 242, 379/219, 220, 221, 224, 225, 229, 230, 207, 231, 165, 112, 243, 244; 395/600; 370/351, 357, 360, 374

[56] References Cited

U.S. PATENT DOCUMENTS

| 4,277,649 | 7/1981 | Sheinbein | 379/201 |
|---|---|---|---|
| 4,695,977 | 9/1987 | Hansen et al. | 379/93.14 |
| 4,727,575 | 2/1988 | Hansen et al. | 379/93.14 |
| 4,747,127 | 5/1988 | Hansen et al. | 379/93.14 |
| 4,763,350 | 8/1988 | Immendorfer et al. | 379/67 |
| 4,782,517 | 11/1988 | Bernardis et al. | 379/201 |
| 4,897,866 | 1/1990 | Majmudar et al. | 379/93.14 |
| 5,050,074 | 9/1991 | Marca | 395/608 |
| 5,386,464 | 1/1995 | Pruitt | 379/201 |
| 5,426,694 | 6/1995 | Hebert | 379/242 |
| 5,471,526 | 11/1995 | Linnermark et al. | 379/268 |
| 5,546,453 | 8/1996 | Hebert | 379/242 |
| 5,594,904 | 1/1997 | Linnermark et al. | 395/704 |

FOREIGN PATENT DOCUMENTS 382 670 A2  8/1990  European Pat. Off. .

OTHER PUBLICATIONS

Ljungblom, *A Service Management System for the Intelligent Network*, Ericsson Review, No. 1, 1990, pp. 32–41.

Jerrold M. Ginsparg and Ronald D. Gordon, *Automatic Programming of Communications Software Via Nonprocedural Descriptions*, IEEE Transactions on Communications, vol. COM-30, No. 6, Jun. 1982, pp. 1343–1347.

*Primary Examiner*—Krista Zele
*Assistant Examiner*—Scott Wolinsky
*Attorney, Agent, or Firm*—Jenkens & Gilchrist, P.C.

[57] ABSTRACT

Special subscriber features within a telecommunications system are programmed using a number of finite state tables. Such tables are stored as data in an erasable memory to enable the telecommunications system to provide different services. The tables are modified to provide different subscriber services by updating the values stored in the state tables without recompiling the executable codes.

21 Claims, 11 Drawing Sheets

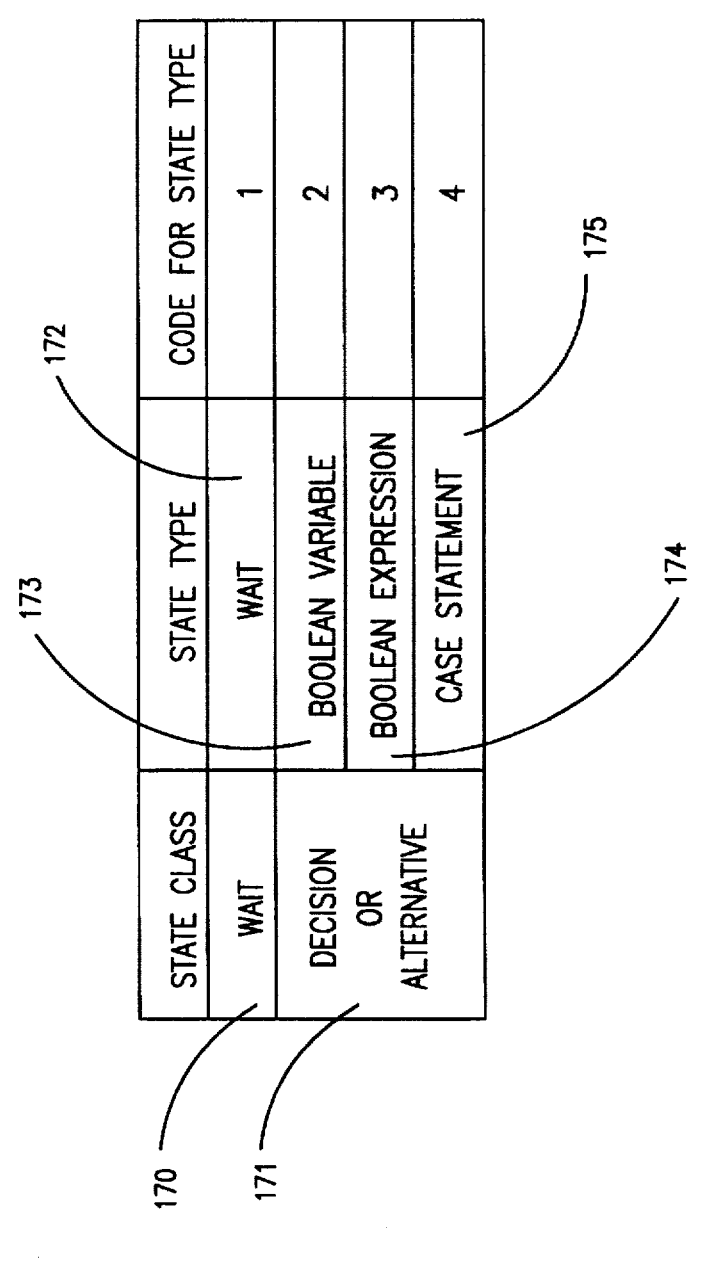

| STATE CLASS | STATE TYPE | CODE FOR STATE TYPE |
|---|---|---|
| WAIT | WAIT | 1 |
| DECISION OR ALTERNATIVE | BOOLEAN VARIABLE | 2 |
| | BOOLEAN EXPRESSION | 3 |
| | CASE STATEMENT | 4 |

*FIG. 4*

ARRAY OF LISTS OF TASKS

| STATE | EVENT 1 / CASE 1 / TRUE | EVENT 2 / CASE 2 / FALSE | . | . | . | . | . | . | EVENT n / CASE n |
|---|---|---|---|---|---|---|---|---|---|
| 0 | | | | | | | | | |
| 1 | | | | | | | | | |
| 2 | | | | | | | | | |
| 3 | | | | | | | | | |
| 4 | | | | | | | | | |
| 5 | | | | | | | | | |
| 6 | | | | | | | | | |

ARRAY HOLDING NEXT STATE

*FIG. 6*

SYSTEM FOR PROVIDING FEATURE SERVICES IN A TELECOMMUNICATIONS SYSTEM

CROSS-REFERENCE TO RELATED PATENTS

The present invention is related to U.S. Pat. No. 5,386,464, the contents of which are incorporated by reference herein.

BACKGROUND OF THE INVENTION

1. Technical Field of the Invention

The present invention relates to telecommunications exchanges and, in particular, to a system for providing features within a telecommunications exchange.

2. History of the Related Art

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

State tables have been used in prior art systems to control the operation of a real-time process by designating a set of tasks to be performed in order to effect a transition from one state to another. Computer languages have been developed wherein transitions from state to state are caused by the execution of a specific set of instructions imbedded within the computer code itself. These systems have proved cumbersome because as modifications to the system are required, the computer program must be recompiled along with the new lines of code necessary to achieve the desired changes and then downloaded to the switch.

State control techniques have been advantageously implemented in telecommunications exchanges due to the nature of the two party model for most communications. With such techniques, each party is sequentially transitioned from state to state to implement the various features of the desired communication. Those transitions are conveniently performed in groups of tasks associated with either a particular special feature or simply those associated with Plain Old Telephone Services (POTS). The provision of different special subscriber features, such as three-way calling, has been a growing and important element in the sale of telecommunications services and the rapid implementation and modification of such features is vital to serving the modern telecommunications customer.

However, different customers may want different behavior for a given feature. Thus, flexibility in modifying features is important as customers change. Further, residential and business subscribers which are likely to have different needs are also likely to be utilizing the same switching system controlled by the same software. With a feature implemented in fixed, compiled code it is expensive to provide for the many variations in the feature which will be required for the various particular customer applications. The programming code becomes large and complicated when multiple variants of a feature are placed in a single block of fixed code. If a separate block is provided for each variant then the sum of the code size for all the variants together becomes very large and the overhead and memory costs are repeated for each block. Fixed code also fails to adequately provide for unforeseen future needs since the only way to provide new behavior in a feature implemented in fixed code is to recompile and re-install the program.

One prior art system disclosed in U.S. Pat. No. 4,727,575 to Hansen, et al. includes a software mechanism which provides that specified actions to effect transitions from state to state were performed irrespective of the circumstances under which the event causing the state transition occurred. The state changes are achieved independent of the overall program and, thus, allow for new features to be added even though the programmer did not have knowledge of the original code and its interaction with the new code. The techniques disclosed in the Hansen patent, however, require an individual computer to be associated with each customer unit in order to execute the program along with the addition of new lines of code for modification as new features and customers are added and changed.

Rapid expansion and rapid changes in the telecommunications field requires rapid development of new features for telephone subscribers. Because the sale of new features and enhancements provide an ever increasing portion of the switched telephone business, it is important to satisfy the needs of customers in a timely manner in order for an operator to remain competitive. Even though state control techniques have been used commonly in function design and block design level of a programming developmental stage, when it comes to implementing the actual program, fixed compiled code is commonly used to represent the state diagram or table. Hence, design methods currently in use with programs which utilize fixed code require a period of approximately one and a half years from initial demand to ultimate delivery. Moreover, any changes or improvements to the existing code have to be recompiled and reinstalled before they can be executed.

Accordingly, in an earlier patent application filed in the name of the same inventor, now issued U.S. Pat. No. 5,386,464 to Pruitt, there is disclosed a system that includes a flexible and table-driven approach for allowing the execution of a telecommunications switch to be altered or modified without recompiling or reinstalling the source code. As disclosed in the Pruitt patent, for each event, a state table points to a list of tasks contained in a separate task-table to be performed by a telecommunications switch to cause a transition from a first state to a second state. In accordance with the teachings of the Pruitt patent, the state table and the task table are not fixed-coded algorithms but rather are data structures stored in an erasable memory such as a Random Access Memory (RAM) unit. Accordingly, one needs to merely change various values stored within the table in order to cause the telecommunications switch to function differently in a certain state. Such a table can reside within an internal memory of a telecommunications switch, or can be stored in an external file and loaded into the internal memory at the time of execution. Such system is referred to in the Pruitt patent as a Finite State Machine (FSM).

However, because of the fact that the above mentioned event and task tables are not made to handle a variety of different values, it imposes certain system limitations. Only one value, the event value, determines which task list needs to be executed in a given state. Accordingly, if a combination of two or more values are needed in order to choose an appropriate task list, the FSM described on the Pruitt patent is not able to accommodate this need without creating additional states to cover all combinations of the two or more values.

Most events or signals within a telecommunications switching system include a number of parameters or values. Such parameters within an event specifies additional information which the telecommunications switch needs in order to properly execute the desired functions. Depending on the value of such parameters, different task lists need to be executed for the same event. For example, after receiving event A, state 1 effectuates the execution of task list A if one of the received parameters has the value of true. Otherwise, state 1 effectuates the execution of task list B. Such comparisons and determinations have to be made repeatedly within a normal computer system, especially in a telecommunications system, in order to reduce code size and memory space. Therefore, it would be advantageous to have an Extended State Machine (ESM) enabling the FSM described in the Pruitt patent to handle additional values or conditions with the added capability of relational operation.

From the foregoing, it can be seen that there exists a need for a software mechanism that provides for state controlled processes by a language which is independent of the computer code used to implement the various tasks associated with transitions from state to state while comparing parameter values and conditions. This new language utilizes tables which can be formulated directly from a tabular description of a feature and then compiled or stored. These tables can be easily modified to provide for new features without recompiling the program code or the tables themselves.

SUMMARY OF THE INVENTION

In one aspect, the system of the present invention includes an extended-event-and-task-table which comprises an array of indexes to an array of lists of tasks (task table). The extended-event-and-task-table defines for a given feature such as three-way calling the various states through which the call can transit, and the events and variables which precipitate those state changes. Furthermore, the extended-event-and-task table specifies for a given state; event, and variables an index to a list of tasks to be performed in order to complete that transition.

From the extended-event-and-task-table, a control program or kernel accesses a task table comprising an array of lists of tasks. For each identified task list there is a sequence of tasks to be performed associated with that list. By operation of the control program, the extended-event-and-task table is accessed and analyzed, via state, event, and additional variable indexes, to determine which list of tasks is to be accessed. The kernel then causes each of the tasks in the list to be performed in sequence.

The states as represented by the extended-event-and-task table are divided into two basic types of states: wait state and decision state. If a current state is a wait state, the kernel retrieves the appropriate task list by indexing on the received event signal and then sequentially executes the tasks specified in the list. However, if a current state is a decision state, then additional variables specified in the extended-event-and-task table is further processed to determine which one of the specified task lists for that state needs to be executed.

When that list of tasks is successfully executed, the next-state-table is accessed via current state, event, and variable indexes. Once the next-state-table is accessed, and the value fetched is stored as the current state, the kernel directs the operation back to the extended-event-and-task-table. The extended-event-and-task-table, task table, and next-state table collectively implement a feature and are referred to collectively herein as a feature table set. The table-driven feature program reads a feature table set stored in computer memory which specifies how a telephone subscriber feature should behave.

Different feature table sets may be stored for different subscribers so that each subscriber who desires may have a customized feature. The system of the present invention also encompasses a programming technique for handling both procedures and signals within a feature program. The use of a feature program supports a rigorous and quick procedure for simultaneously describing and implementing a feature. Further, it enables a very fast and flexible way of changing the way in which a feature behaves without recompiling the feature program. Only the data stored in the tables needs to be changed in order to enable a change to be made in the behavior of the feature. Changes to a feature program which has already been installed, can have the same syntax checks and correctness checks as are provided for pre-installation table translations if the data is first put through an analyzer. This technique automatically supports a high degree of consistency and quality of feature design by ensuring that pure extended state machine principles are followed.

If a problem is discovered with a feature or the customer simply wishes for a feature to behave differently than it currently does, the method of the present invention offers the possibility of changing the feature without re-installing or recompiling the feature program. Only the data controlling the feature program needs to be changed. This can be done quickly in the field and complicated, often error-prone patches are not required.

The method of the present invention also controls state transition by use of tables which greatly enhances state-oriented design of the various features. This approach provides a close correspondence between the design of a new feature and its implementation since both can be formatted in tables. Changes within the system are easily effected by simply changing certain values within a table rather than recompiling the entire feature program. The development of a state table to control program code is highly advantageous because such a state table can be derived automatically from a feature table set which describes the feature in an easily understood manner. Furthermore, the use of such tables is compatible with existing switch hardware and software in that it mainly requires data space which is available and inexpensive. Lastly, the FSM discussed in the Pruitt patent is improved due to its enhanced capabilities on determining the pointer to a task list while evaluating more than one value for a single state. One of those values can be an incoming signal value (event value) and the other can be a value contained within a memory variable.

BRIEF DESCRIPTION OF THE DRAWINGS

FIG. 4 is a table illustrating different types of states in accordance with the teachings of the present invention;

FIG. 6 is a table illustrating a next-state-table;

DETAILED DESCRIPTION

Figure 1:
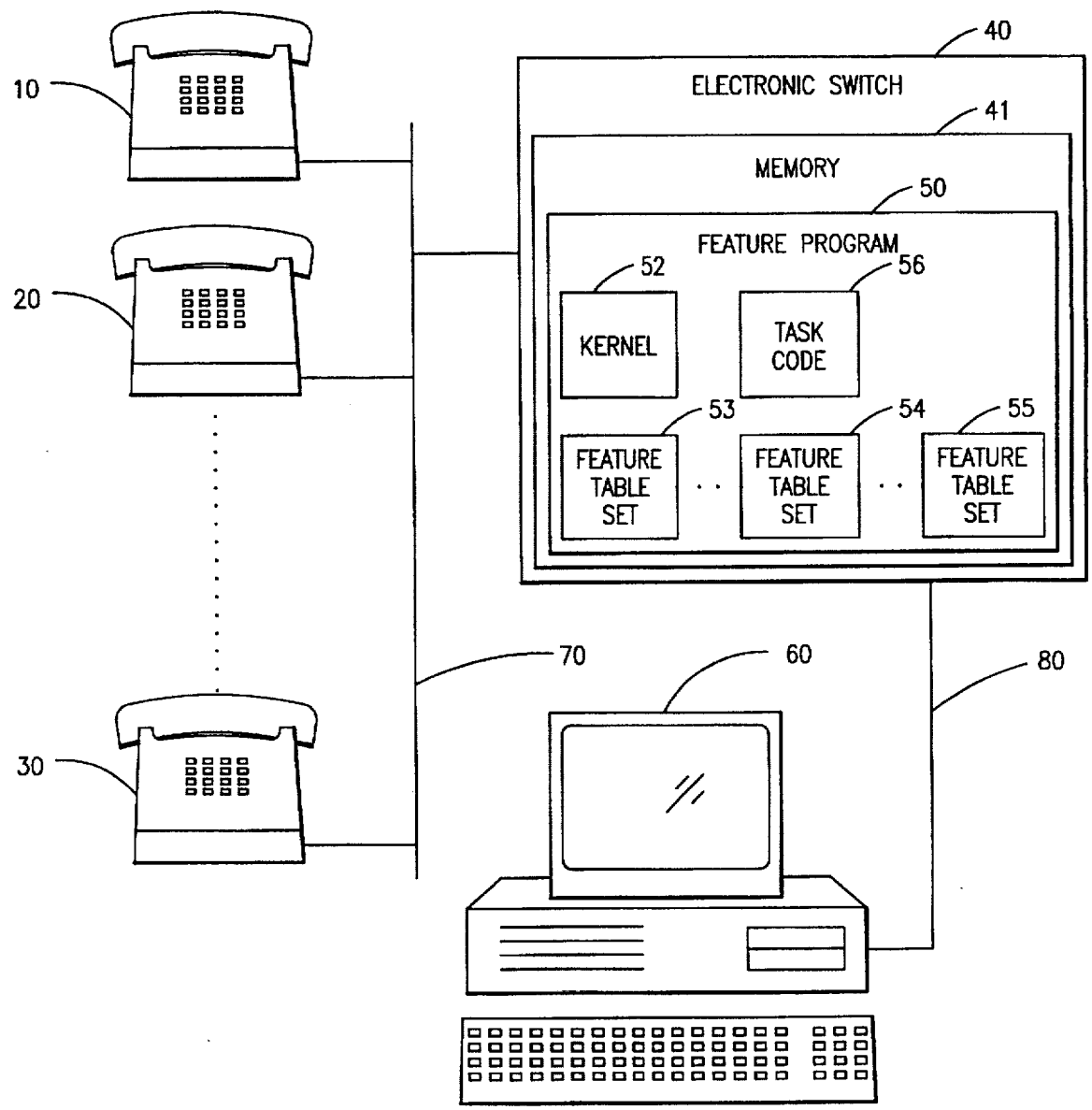
FIG. 1 is a block diagram of a telecommunication system utilizing the principles of the present invention.

The system of the present invention is advantageously implemented by the hardware system illustrated in FIG. 1. It would be obvious, however, to one skilled in the art that other hardware systems are controllable by the illustrative software system. The hardware of FIG. 1 comprises a plurality of customers units 10–30. Voice and data information is communicated from the customer units 10–30 via transmission lines 70. Voice and data transmissions are sent to an electronic switch or stored programs controlled (SPC) telecommunications exchange 40 which comprises the hardware and software necessary for interconnecting the subscribers and controlling the flow of voice and data signals through the exchange. Within the electronic switch 40 is a memory 41 which contains a feature program 50 which embodies and utilizes the method and system disclosed in the present invention. The feature program 50 is comprised of a plurality of feature table sets 53–55; a kernel 52, and a fixed task code 56. The electronic switch 40 is connected by a data transmission line 80 to a computer interface 60 which is utilized to modify aspects of the feature program 50 as necessary. Other methods could be utilized to control and modify aspects of the feature program 50 and language.

Part of the method for speeding up the development of a feature employed in the present invention is to specify, unambiguously and precisely, what the feature providing program is to do. It is difficult to specify complex feature behavior in text in a natural language like English. In order to overcome this difficulty with natural languages, a language called Design-Oriented State Table Language (DOSTL) is defined. DOSTL removes ambiguities and the difficulty of following the many different alternative sequences of events which can occur with subscriber features when they are described in natural language text. To a certain extent, this language provides self-checking procedures to ensure that the designer has anticipated all possible situations.

Figure 2:
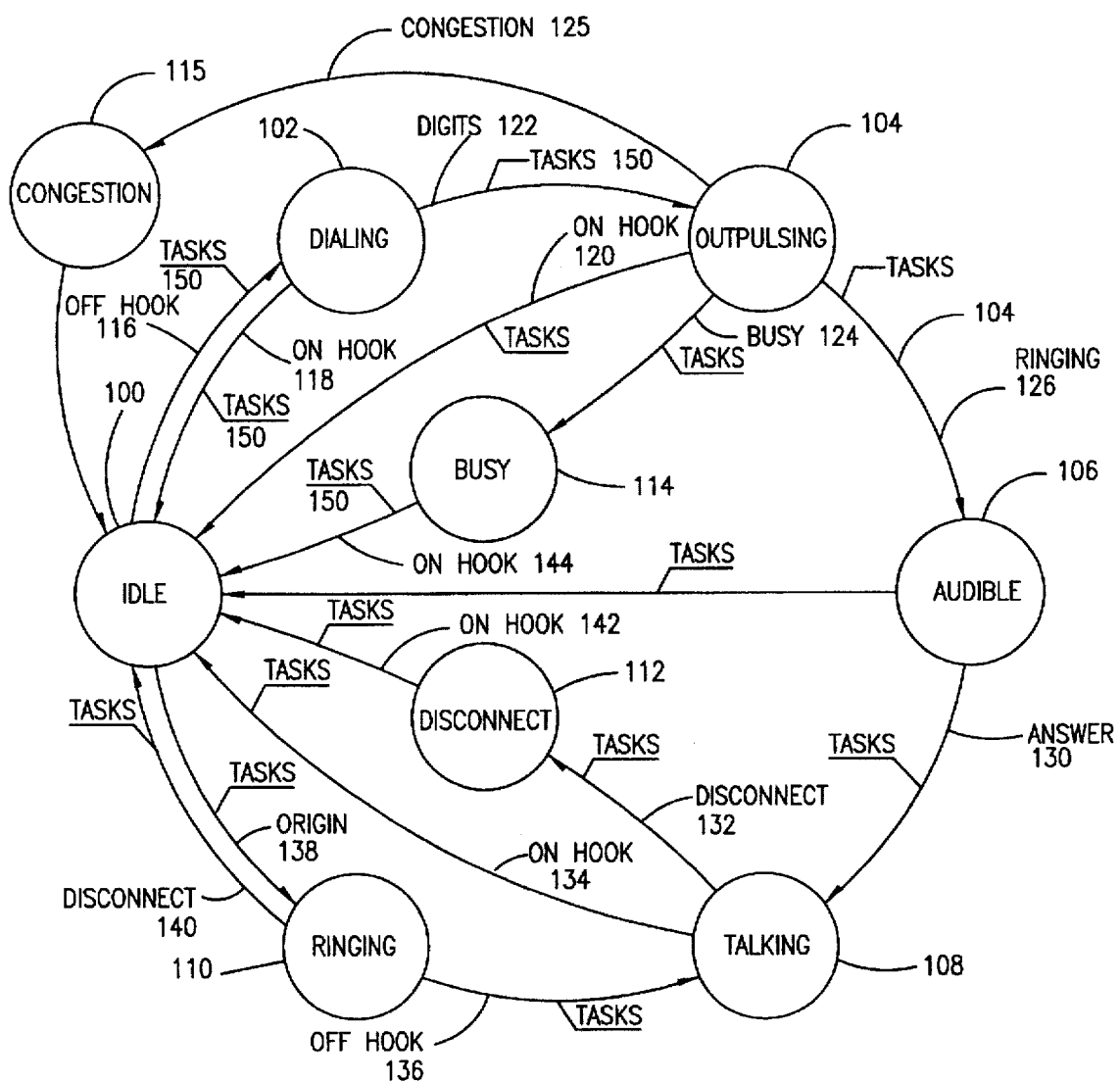
FIG. 2 is a transition state diagram illustrating the various states through which a customer unit of the telecommunication system of FIG. 1 may pass.

FIG. 2 illustrates, in a transition state diagram, the various states 100–114 at which one of the customer units 10–30 may be during any particular point in time in the progress of a line-to-line call. The number of illustrative states could be expanded to meet new system requirements. In addition to the signals illustrated in FIG. 2, exit and enter signals may be generated each time a state transition occurs. Associated with each transitional event are a number of tasks 150 which are performed in sequence in order to complete the transitions required. Signals 116–144 represent the events whose individual occurrences cause a transition from one state to another state. The number of signals could be expanded to meet new feature requirements.

For example, in order to place a call, a customer unit must be initially in an idle state 100 and go off-hook. The event of going off-hook places the customer unit in a dialing state 102 via an off-hook signal 116. Off-hook 116 is the event which precipitates performance of a series of tasks 150 to arrive at the new state of dialing 102. After the appropriate digits have been collected from the terminal, the state is changed from the dialing state 102 to the out-pulsing state 104 via a digits signal 122. Again, the digits are analyzed by a series of tasks 150. Of course, the tasks associated with the off-hook state 116 would probably be different from the tasks associated with the out-pulsing state 104.

In the out-pulsing state 104, the party being called is sent a request for call termination. If the call termination is unsuccessful, depending on one of the parameters contained in the setup-fail signal, either the busy state 114 is entered via a busy signal 124 or the congestion state 115 is entered via a congestion signal 125. If the calling party unit goes on-hook while in the out-pulsing state 104, or the dialing state 102 or the busy state 114, then the calling party unit is returned to the idle state 100 via either an on-hook signal 120, 118 or 144, respectively. As indicated above, a transition to either the busy state 114 or the congestion state 115 is precipitated by the same setup-fail signal. Branching off to two different states from a single signal depending on the values of additional variables is currently not possible with conventional FSM unless separate event values and states are created to represent the above two situations separately. The system of the present invention, on the other hand, has the enhanced capabilities of evaluating additional variables, such as the parameters included in an incoming signals or memory variables, to enable a single state to transit to multiple states in response to the evaluation of such additional variables with the received event signal.

If the call termination is successful, then the calling party unit enters the audible state 106 via a ringing signal 126. While in the audible state, the calling party unit hears a ring back tone. If the calling party unit goes on-hook during the audible state 106, it is transferred back to the idle state 100 via an on-hook signal 128. Once the called party unit answers the call, the calling party unit is transferred to the talking state 108 via an answer signal 130.

Upon entering the talking state 108, the calling and called parties communicate with each other via voice and data transmission lines 70. If the called party hangs up first, the calling party is transferred from the talking state 108 to the disconnect state 112 via a disconnect signal 132. If the calling party hangs up first, the calling party is transferred from the talking state 108 to the idle state 100 via an on-hook signal 134.

Consider the previous example from the point of view of the called station. Upon receipt of a message indicating that another customer unit wants to set up a voice connection, the called customer unit is transferred from the idle state 100 to the ringing state 110 via an origin signal 138. While in the ringing state 110, the called party receives an audible ringing indication. If the called party unit goes off-hook, it is transferred to the talking state 108 via the off-hook signal 136. If instead, the calling unit goes on-hook while the called unit is in the ringing state 110, it transmits a disconnect signal contained in a message communicated via a transmission lines 70. In response to the disconnect signal, the called customer unit is transferred from the ringing state 110 to the idle state 100 via the disconnect signal 140.

Figure 3:
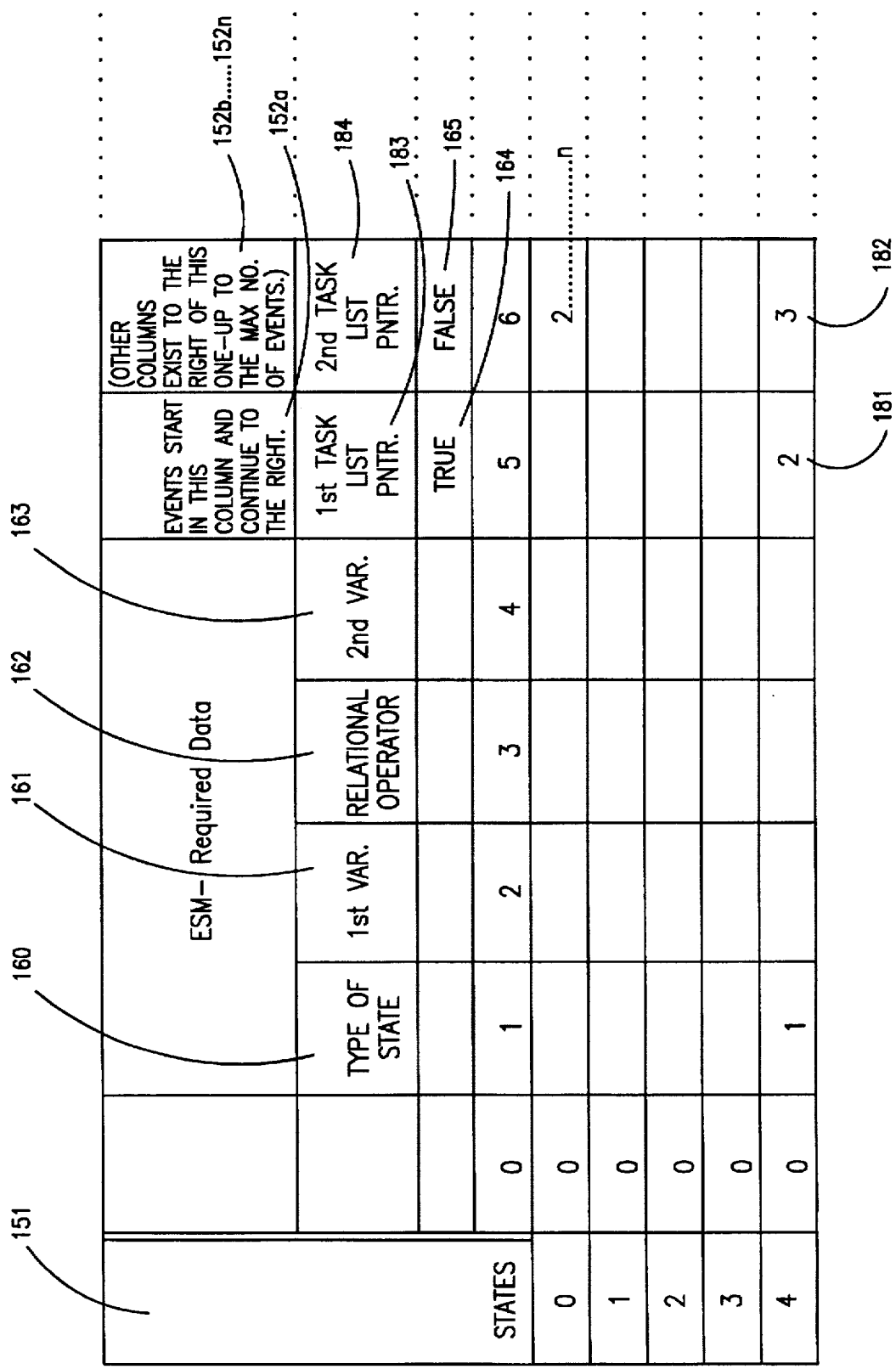
FIG. 3 is a table illustrating an extended event-and-task-table.

Having reviewed the state table conceptualization of conventional telecommunications switching, a feature table set for implementation of the transitions from various states (such as those shown in FIG. 2) in accordance with the system of the present invention is illustrated in FIGS. 3, 4, 5 and 6. FIG. 3 is an example of an extended-event-and-task-table which includes the set of states associated with a particular feature or service. The states 151 are identified by the row headers. The states, of the types illustratively shown in FIG. 2 and which would be identified by numerals in an extended-event-and-task-table such as FIG. 3, are states 100–114. Some of the column headers within the extended-event-and-task-table of FIG. 3 represent the different events 152 which precipitate changes from state to state in order to complete a particular feature or function. The precipitating events (of the type also illustrated in FIG. 2) which would be identified by event numerals in an extended-event-and-task-table such as FIG. 3 are events 152a–152n.

The present invention further categorizes the states into several different types of states to enhance the capability of the Finite State Machine (FSM) into an Enhance State Machine (ESM). Accordingly, the type-of-state-column 160 specifies what type of state that particular state represents. As illustrated in FIG. 4, there are basically two classes of states: the wait state and the decision state. If the current state is a wait state, the state is waiting for an event to occur. Once an event is received at this state, the appropriate event column 152 shown in FIG. 3 is indexed to retrieve a desired task list number. For example, state 4 is a wait state, as represented by numeral 1 in the type-of-state column 160, and is waiting for an incoming event. When event number 1 is received, the event column 152a is indexed and task list 2 is retrieved as represented by numeral 2 stored in the memory location 181. If event number 2 is received, the event column 152b is indexed and task list 3 is retrieved as represented by numeral 3 stored in the memory location 182 and so forth.

However, if the current state is a decision state, the kernel must evaluate additional variables in order to choose an appropriate tasks list from the extended-event-and-task table. Accordingly, the decision states are further categorized into three different types of states as shown in FIG. 4. They are the boolean variable state, boolean expression state, and CASE statement state. If the current state is a boolean variable state then a boolean variable is retrieved from the column 161. Boolean variables have only two possible values (true or false), and if the boolean variable stored in the column 161 has the value of true, then the TRUE column 164 is indexed to retrieve the appropriate task list. If the value of the variable is false, the appropriate task list from the FALSE column 165 is indexed and accordingly retrieved.

If the current state is a boolean expression state then the first variable 161, the second variable 163, and the relational operator 162 are indexed and retrieved from the extended-event-and-task-table. The two variables are evaluated using the relational operator 162 to determine whether the overall relational condition is true or false. For example, the first variable 161 may be variable X, the second variable 163 may be variable Y, and the relational operator 162 may be the boolean expression "<" (less than). If X is less than Y then the evaluation is true and the task list stored in the TRUE column 164 is retrieved and executed. If X is not less than Y, then the evaluation is false and the task list stored in the FALSE column 165 is retrieved and executed. The columns representing true and false are the same columns representing event 1 and event 2. This overlapping reduces memory space while implementing the extended-event-and-task table because no state can be both a wait state and a decision state. Accordingly, there is no situation where the event columns 152 and decision columns 164 and 165 are both needed at the same time.

Lastly, if the current state is a case statement state, then the first variable is indexed and retrieved from the column 161. The value of the first variable is evaluated by itself by the kernel, and if the value is 1, the task list under the 1st-task-list-pointer-column 183 is indexed and retrieved. If the value is 2, the next column 184 is indexed and retrieved and so forth.

Such variables and relational operators enable a FSM system to utilize additional values other than the state value to further index and retrieve desired task list pointers. As a result, multiple task lists can be assigned to a single state for a single event enabling more complicated programs to be represented by a state table without extensive memory spaces and state values.

Accordingly, FIG. 4 is a table illustrating the different classes and types of states in accordance with the teachings of the present invention. As illustrated previously in FIG. 3, the wait state 170 and the decision or alternative state 171 are the two classes of states. The decision class is further divided into three different types of states. They are the boolean variable state type 173 represented by numeral 2, the boolean expression state type 174 represented by numeral 3, and the CASE statement state type 175 represented by numeral 4.

Since the event and task table and the task-list appendix are represented in a particular format and according to a set of syntax rules, a feature program can read the table and perform a number of useful operations on the data. Accordingly, an extended-event-and-task-table as shown in FIG. 3 would be associated with a particular feature such as call waiting or three way calling and is stored as a data array in a traditional memory system.

When a DOSTL state table is input to the kernel, another essential table must also be available to the kernel at the same time. The other essential table is the task table which is derived from the DOSTL state table.

Figure 5:
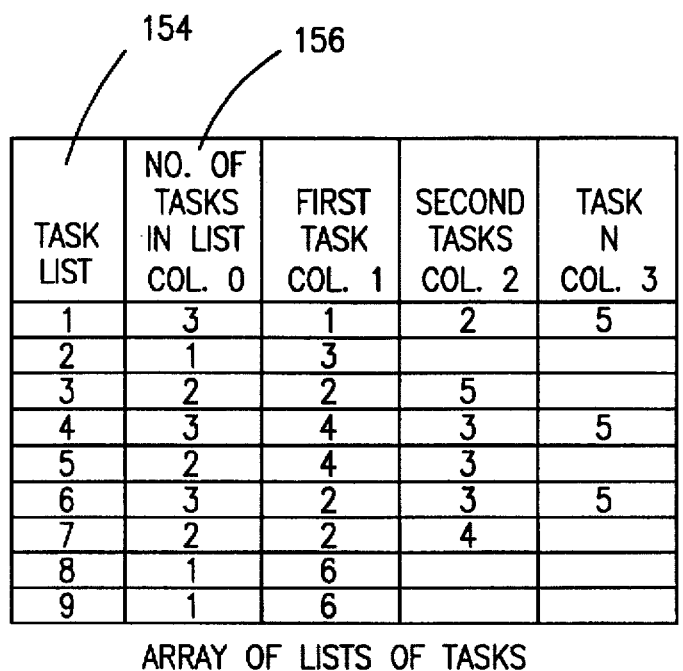
FIG. 5 is a table illustrating a task table.

FIG. 5 is a task table associated with the task list number which was generated as the output from the extended-event-and-task-table of FIG. 3. The rows of FIG. 5 comprise the numbers associated with the task lists 154. Each task list has associated with it a first column zero 156 which identifies the number of tasks in that particular list. A task counter is used to instruct the kernel to perform the sequence of tasks associated with the task list. The remaining columns of FIG. 5 contain an identification of the various specific tasks which must be performed in order to complete that task list and thus complete the transition from one state to the other. As will be more fully described below, each task number includes a pointer to program code contained in memory for performing that task. Once all of the tasks are performed with respect to a particular task list, the system then looks to FIG. 6 showing the array holding next state to determine the next state. The structure of the next-state-table is similar to the extended-event-and-task-table. However, instead of containing pointers to task-lists, the next-state-table instead contains values representing the next states to be transited from a current state. The kernel operates similarly on the next-state-table as on the extended-event-and-task-table and accordingly indexes the next-state-table depending the current state and the received or calculated event value to retrieve the value of the next state. Once an output is obtained from the next state table of FIG. 6 and the new state has been set, the operation returns to the extended-event-and-task-table of FIG. 3 to determine the type of the new state. If the new state is a wait state, the kernel awaits for the next precipitating event. However, if the next state is a decision state, then the extended-event-and-task-table is further indexed to evaluate the specified variables.

For any particular feature, such as call waiting or three way calling, there is associated with it one of each of the tables represented by FIGS. 3, 5 and 6. These tables are operated upon by a kernel which executes the series of steps necessary to work through the input and output side for each of these tables.

State-altering data may be received in one or more signal parameters. Each unique, state-altering combination of data which may possibly be received by a feature program must be conventionally considered as a separate "event". That is, each "combination" of data must currently be considered as a separate event.

For example, consider the case where a signal SUBACTIVITY has two parameters capable of altering the state. The parameters are parameter "x" and parameter "y". Parameter "x" specifies the subscriber as "A", "B", or "C". Parameter "Y" specifies the action the subscriber has performed. Valid possible values for "Y" are "answer", "flash", or "on-hook". If it is possible to receive all possible "Y" values for each of the possible "X" values then the number of valid events is currently nine. The number of combinations is found by adding up all the valid possible combinations of data. In this case, it is three subscribers times three things they can do, equaling nine combinations. An event-and-task table implemented according to the FSM discussed in the above-referenced Pruitt patent would require nine different event values to individually represent the above three subscribers, each subscriber having three different subscriber actions. On the other hand, using the extended state machine (ESM) of the present invention, the extended-event-and-task table only needs three different event values. Each. state within the ESM further contains a CASE variable to further index the subscriber action variable Y. If the parameter Y is "answer", the first task list pointer 183 in FIG. 3 is indexed to retrieve the appropriate task list. If it is "flash", the second task list pointer 184 is indexed. This enables the system to evaluate more than one variable to determine which state to transit to and also enables multiple next states to be assigned to a single state with a single event.

Figure 7:
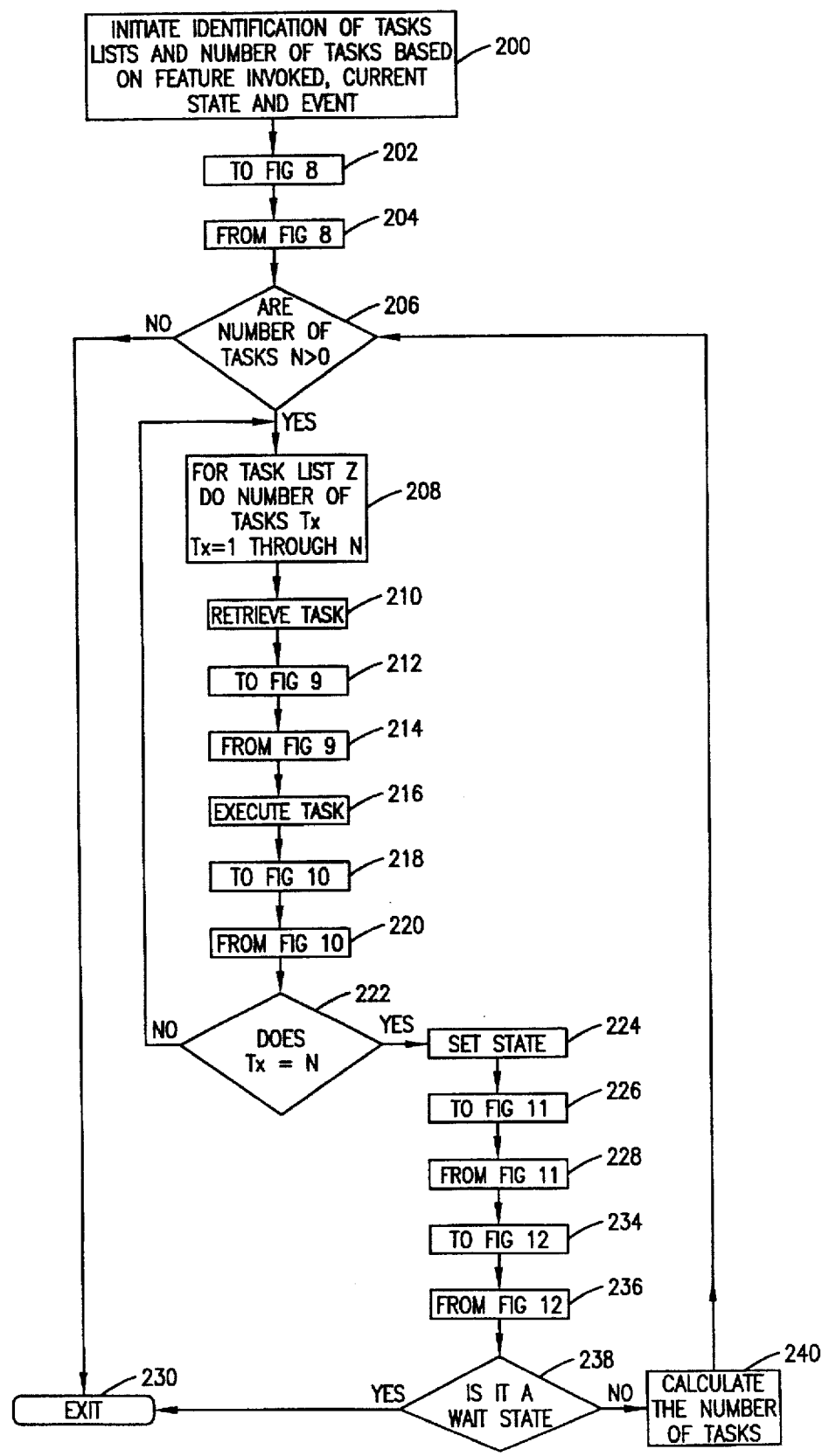
FIG. 7 is a flow chart illustrating the kernel which controls implementation of design oriented state table language.
Figure 8:
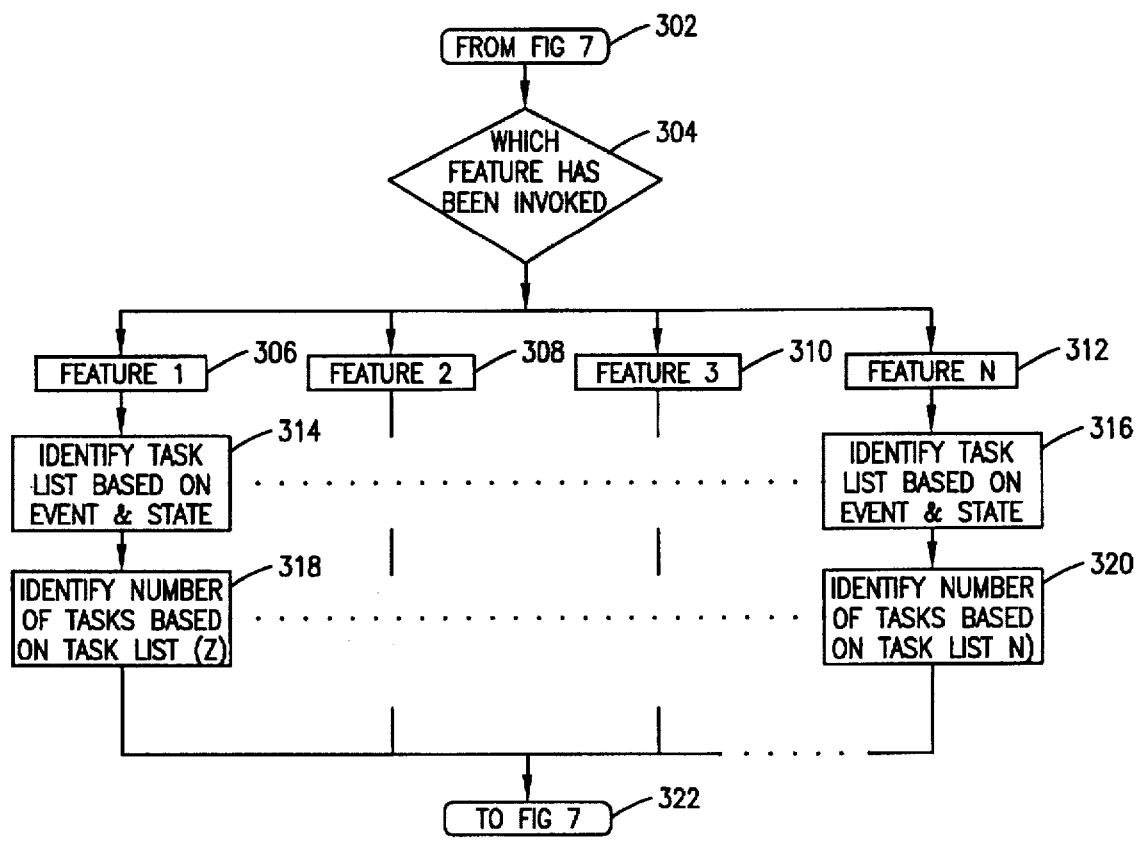
FIG. 8 is a flow chart illustrating identification of a task list and number of tasks from an array of task lists.

To further illustrate the principles of the present invention and the manner in which the kernel drives the interaction between the tables shown in FIGS. 3, 5, and 6, FIG. 7 depicts a flow chart illustrating the operation of the control program comprising the kernel. Referring now to FIG. 7, the kernel directs the operation and interaction of the state tables of FIGS. 3, 5 and 6. The kernel begins at box 200 whereby initiation of the identification of task lists and the number of tasks to be performed is retrieved from memory based on the feature invoked, the current state and the precipitating event signaling a transition from the current state to the new state. At 202, the kernel proceeds to FIG. 8 and step 302 at which point, the logic enters decision step 304 which determines which feature has been invoked. As discussed earlier, each feature has associated with it three separate tables through which the kernel proceeds. Therefore, depending on which feature has been invoked, the flow is directed to one of the feature chains 306 through 312. Once a feature has been identified, the kernel then identifies the task list based on the precipitating event and current state, e.g., at 314 for feature 1 and at 316 for feature N. Since the idle state is normally a wait state, the kernel retrieves a task list index number based on the two inputs of event and current state. Once the task list index number is identified, the logic of FIG. 8 proceeds at 318–320 to determine the number of tasks to be performed. The number of tasks to be performed "N," is drawn from a task table such as that shown in FIG. 5. As will be discussed below, the number of tasks "N" is used as an identification of how many times the kernel must fetch a task and execute it. Once the task list has been identified and the number of tasks: has been identified, the flow moves to 322 from which it proceeds back to FIG. 7.

Figure 9:
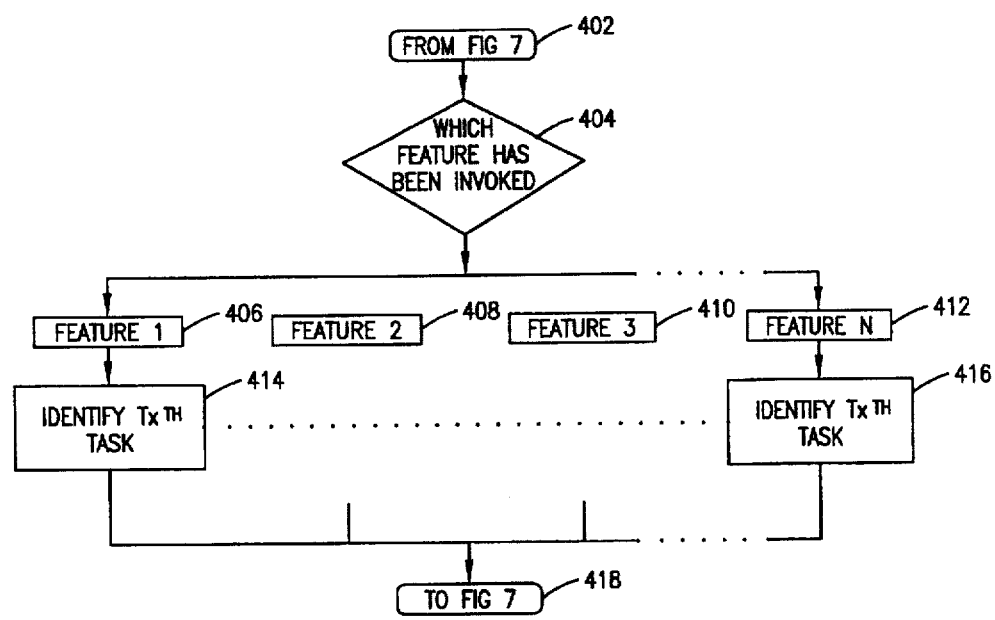
FIG. 9 is a flow chart illustrating the identification of a particular task to be performed.

Referring to FIG. 7 at direction circle 204, the flow moves from 204 to decision point 206, where there is a determination as to whether or not the number of tasks is greater than 0. This step is primarily a check to make sure that the task table from which the number "N" was drawn did not contain some error which would result in "N" being equal to 0. If the number of tasks identified was not greater than 0, the "no" path is taken to 230 for a fault result and exit. If the number of tasks is greater than 0, the "yes" path is taken at 206 and the kernel begins execution of the various tasks in a sequential manner. At 208, the variable $T_x$ is set equal to 1 and then incremented in consecutive integers until it reaches the value of "N". After setting the value of $T_x$, the flow proceeds to 210 at which it initiates retrieval of the $T_x$th task which, in the first instance, would be the first task. To initiate retrieval of tasks, the flow moves to 212 which takes it to FIG. 9 at step 402. Moving from 402 to decision point 404, the kernel determines which feature has been invoked. By identification of the appropriate feature, as either 406, 408, 410 or 412, the proper task table is retrieved along with its corresponding task list. Features 406–412 can comprise whatever features have been devised by the system programmer, an example of which would be three-way calling or call waiting. After the identification of the appropriate feature at 406–412, the flow proceeds to the corresponding step of 414–416 which identifies the $T_x$th task on the task list. For example, if this were the second time that the system had proceeded through the task list, it would be identifying the second task on the list of tasks. The flow then proceeds to 418 and returns to FIG. 7 at 214.

Figure 10:
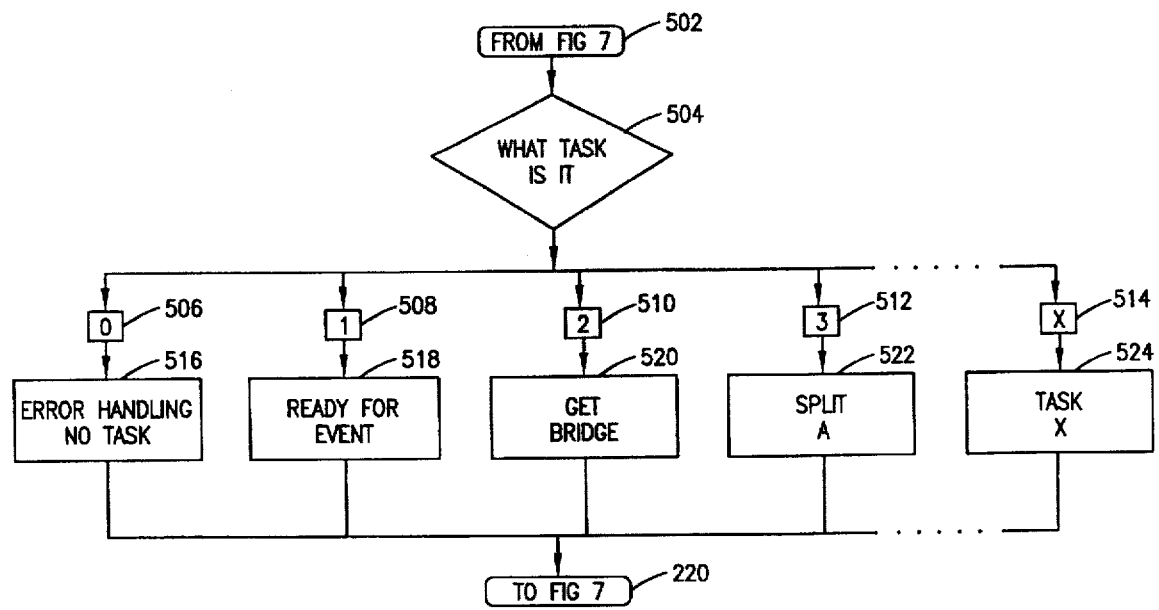
FIG. 10 is a flow chart illustrating the retrieval of a particular task for execution.

The kernel of the present system then proceeds to execution of the selected task at 216. Thereafter the flow proceeds to 218 which directs the flow to FIG. 10. From step 502, the kernel moves to 504 at which point the kernel determines what task to perform. As previously noted, on FIG. 9, the task number was identified as illustrated on the task table shown in FIG. 5. That task number is associated with a block of program code which would perform a particular set of steps. For example, tables I, II, III and IV show the program code written in the PLEX language for performing specific tasks.

Table I shows the source code for making a third caller identified as the "C" caller disjoint, i.e., for putting the caller on hold. Table II shows the code for disconnecting a second caller identified as the "B" caller. Table III shows the code for sending a busy tone to a second caller identified as the "B" caller. Table IV shows the code for totally disconnecting the call.

TABLE I

| | | |
|---|---|---|
| 3485. | SPLIT C | MAKE C DISJOINT |
| 3486. | ! | |
| 3487. | SPLITC) | |
| 3488. | | |
| 3489. | IF CSTATUS = ZCONN PROCEED | |
| 3490. | ELSE GOTO SPLITC90; | |
| 3491. | | |
| 3492. | SEND SPLIT REFERENCE FSHREF WITH | |
| 3493. |    FSHPTR, | |
| 3494. |    TWCPTR, | |
| 3495. |    COWNREF, | |
| 3496. |    CLEGID, | |
| 3497. |    BRIDGESIEZED, ! BRIDGE VALIDITY (GUARD BIT) ! | |
| 3498. |    BRIDGEID; ! BRIDGE IDENTITY ! | |
| 3499. | | |
| 3500. | TRL = ZSPLITC10; DO PUSH; EXIT; SPLITC10) | |
| 3501. | | |
| 3502. | CSTATUS = ZDISJ; | |
| 3503. | DO COUNTCONN; | |
| 3504. | | |
| 3505. | SPLITC90) | |
| 3506. | | |

TABLE I-continued

3507. GOTO SUBRET; ! END OF SPLIT C SPLIT !

TABLE II

3530. FREE B        DISCONNECT B
3531. !
3532. FREEB)
3533.
3534. IF BSTATUS = ZDISJ PROCEED
3535. ELSE GOTO FREEB90;
3536.
3537. SEND FREE REFERENCE FSHREF WITH

TABLE II-continued

3538.      FSHPTR,
3539.      TWCOTR,
3540.      COWNREF,
3541.      BLEGID;
3542.
3543. TRL = ZFREEB10; DO PUSH; EXIT; FREEB10)
3544.
3545. BSTATUS = ZDISC;
3546.
3547. FREEB90)
3548.
3549. GOTO SUBRET; ! END OF FREEB !

TABLE III

2965. SEND BUSY TONE TO "B".
2966. !
2967. TOBSNDBUSY)   ! TO "B" SEND BUSY TONE - TASK !
2968.
2969. IF TONETOB = FALSE PROCEED
2970. ELSE GOTO TOBSNDBUSY90;
2971.
2972. SEND SENDINF REFERENCE FSHREF WITH
2973.   ! 1 ! FSHPTR,          ! SEND BUSY TONE TO B   !
2974.   ! 2 ! TWCPTR,
2975.   ! 3 ! COWNREF,
2976.   ! 4 ! BLEGID,
2977.   ! 5 ! ZDYNTABLE4,      ! DYN TABLE - MSG INFO  !
2978.   ! 6 ! 1,               ! MESSAGE NO.
        !
2979.   ! 7 ! 7,               ! ELEMENT = SEND BUSY TONE !
2980.   ! 8 ! BRIDGESIEZED,
2981.   ! 9 ! BRIDGEID;
2982.
2983. TRL = ZTOBSNDBUSY10; DO PUSH; EXIT; TOBSNDBUSY10)
2984.
2985. CASE TSIGNALRESULT IS
2986. WHEN ZSUCCESS DO;      ! CONTINUE. !
2987.     TONETOB = TRUE;
2988. WHEN ZFAILURE DO
2989.     FINISHRESULT = ZFAILUREDEFAULT;
2990.     GOTO RETURNAB;
2991. OTHERWISE DO
2992.     GOTO HANGEXIT;
2993. ESAC;
2994.
2995. TOBSNDBUSY90)
2996.
2997. GOTO SUBRET; ! END OF TOBSNDBUSY   !

TABLE IV

4563. ===================================================
4564. PROCEDURE   TOTALDISC   TOTALDISCONNECT   TOTAL DISCONNECT
4565. ===================================================
4566.
4567. THIS PROCEDURE WILL COMPLETELY DISCONNECT THE CALL. IT WILL SPLIT ANY
4568. CONNECTED LEGS, FREE THEM, DECREMENT THE TRAFFIC LEVEL COUNTER,
4569. AND FINISH.
4570. !
4571. TOTALDISC)
4572.
4573. TRL = ZTOTALDISC10; DO PUSH; GOTO SPLITC; TOTALDISC10)
4574.
4575. TRL = ZTOTALDISC20; DO PUSH; GOTO SPLITB; TOTALDISC20)
4576.
4577. TRL = ZTOTALDISC30; DO PUSH; GOTO FREEA; TOTALDISC30)
4578.
4579. TRL = ZTOTALDISC40; DO PUSH; GOTO FREEB; TOTALDISC40)
4580.
4581. TRL = ZTOTALDISC50; DO PUSH; GOTO FREEC; TOTALDISC50)

TABLE IV-continued 4582.
4583. GOTO FINISHEND;
4584.
4585. ! ABSOLUTE END OF PROCEDURE TOTALDISC TOTALDISCONNECT !

Figure 11:
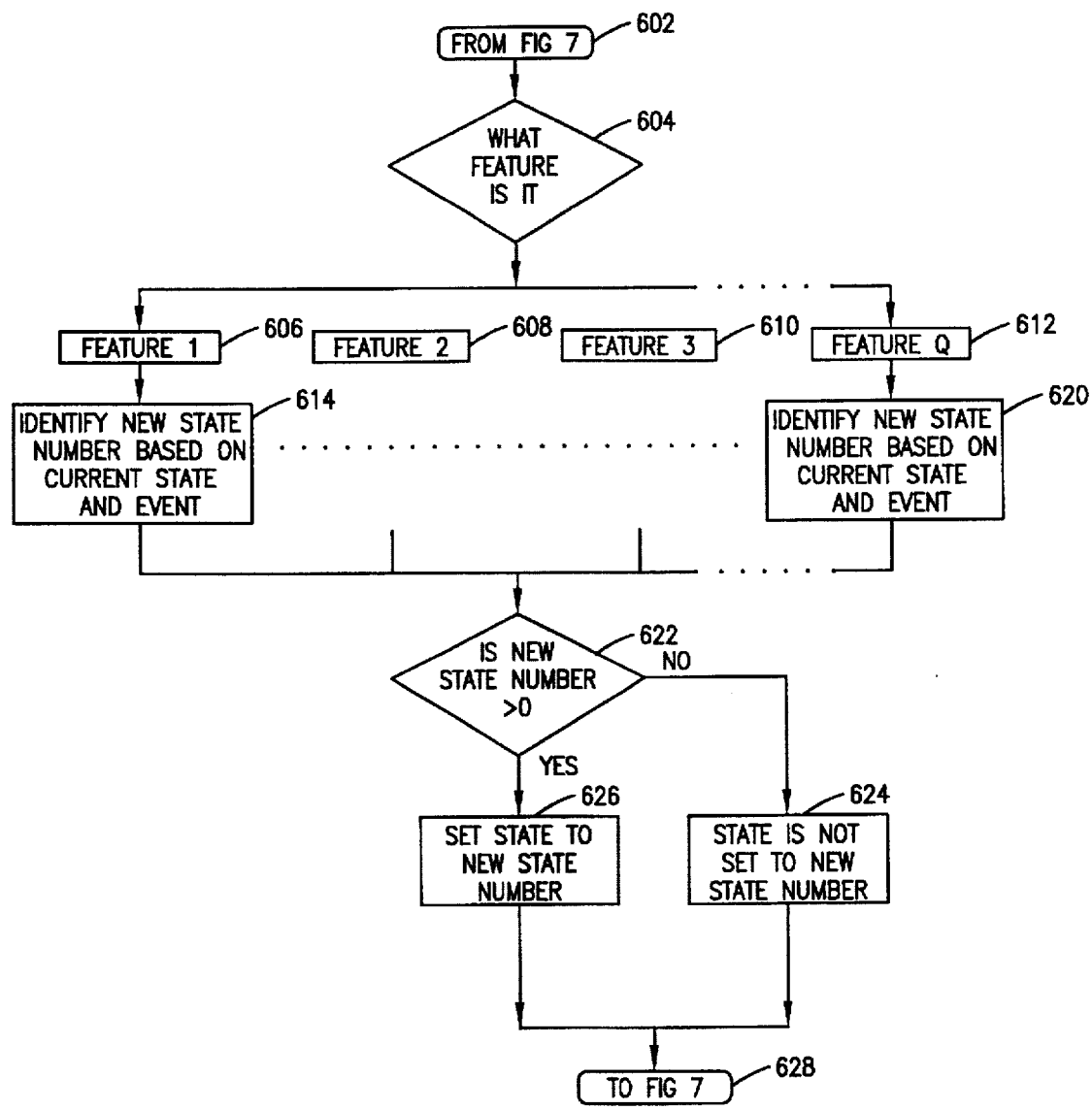
FIG. 11 is a flow chart illustrating the identification of a new state after implementation of a series of tasks.

Returning to FIG. 10, identification of one of the many tasks is determined at 504. The decision flow then proceeds to the selected one of the particular task numbers 506–514 which in turn identify the specific tasks 516–524. Once there is an identification of one of the specific tasks 516–524, the kernel retrieves the actual program code such as that shown in tables I, II, III and IV and performs those steps. At 220, the kernel returns to FIG. 7 and enters decision step 222 thereof to determine whether the variable $T_x$ is equal to the number of tasks. If it is not, the "no" path is taken back to step 208 and the variable $T_x$ is set to the next number and retrieval of the next task is performed at step 210 and so forth. If the variable $T_x$ does equal "N" then all of the tasks have been performed and the kernel proceeds to step 224 which involves setting a new state. From step 224 the kernel proceeds to step 226 which directs the kernel to FIG. 11 at step 602. From step 602 it proceeds to step 604 to determine which feature was invoked. Identification of which feature has been invoked is necessary because a next-state table similar to that which is depicted in FIG. 6 is associated with a particular feature. Therefore, the decision block 604 determines which of the features 1–N (606–612) have been invoked. Once a feature is identified, the kernel proceeds to one of steps 614–620 depending on which feature has been selected to identify a new state based on the current state and event. A new state number is determined by reference to a next-state table similar to that depicted in FIG. 6. Based on the previous state and the precipitating event, a new state is selected. Once that state number has been determined the kernel enters step 622 to make sure that the new state number is greater than 0. If the new state number is not greater than 0, there is some error in the feature program, and the kernel takes the no path and does not reset the state from what it previously was which occurs at step 624. If the new state number is greater than 0, indicating that an appropriate state has been selected, the yes path is taken from 622 to step 626 and a new state is set at that number. Either way, the kernel returns from FIG. 11 at step 628 to FIG. 7 at step 228.

Figure 12:
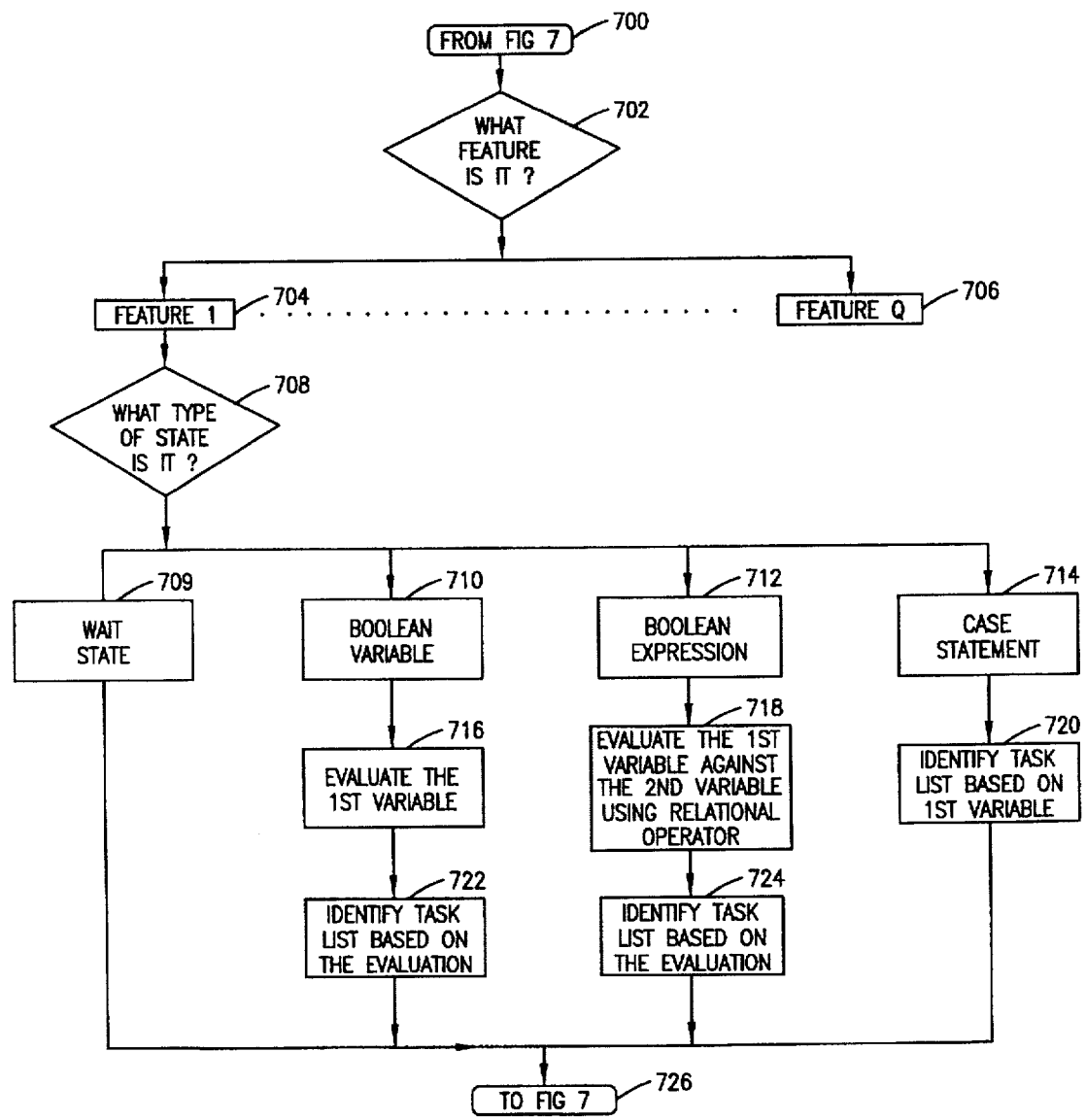
FIG. 12 is a flow chart illustrating the identification of a decision state, variables and boolean operators from the extended event-and-task-table.

At 232, in order to determines whether the next state is a wait state or a decision state, the kernel proceeds to step 234 which directs the kernel to FIG. 12 at step 700. From step 700, it proceeds to step 702 to determine which feature was invoked. Once a feature has been identified at step 704; the kernel then seeks to identify the type of state by evaluating the value stored in the type-of-state column 180 of the extended-event-and-task-table at step 708. If the current state is determined to be a wait state at step 709, the kernel merely returns to FIG. 7 at step 726. However, if the current decision state is a boolean variable state 710, the first variable 161 of the extended-event-and-task table is evaluated to determine whether the task list points stored under the TRUE column 164 or the FALSE column 165 should be selected at step 716. Depending on the boolean value of the first variable 161, the appropriate task list pointer is selected at step 722.

If the current decision state is a boolean expression state 712, the first variable 161 and the second variable 163 of the extended-event-and-task table are evaluated using the relational, operator 162 of the same table at step 718. If the overall relational equation has the value of TRUE, the task list pointer under the TRUE column 164 is selected. Otherwise, the task list pointer under the FALSE column 165 is accordingly selected at step 724.

Alternatively, if the current decision state is a case statement state 714, the value of the first variable 161 is used as an index to select the pointer to a task list at step 720. If the value of the first variable is 1, the first task list pointer column 183 of the extended-event-and-task table is selected. If the value is 2, then the second task list pointer column 184 of the same table is selected and so forth.

Finally, the kernel returns from FIG. 12 at step 726 to FIG. 7 at step 236.

If the current state is a wait state, the "yes" path is taken at step 238, and the kernel exits and awaits for the next precipitating event at step 230. On the other hand, if the current state is one of the decision states, the "no" path is taken at step 238, and the number of tasks in the selected task list is determined at step 240. The kernel then returns to step 206 to begin execution of the various tasks in a sequential manner as described previously.

It is thus believed that the operation and construction of the present invention will be apparent from the foregoing description. While the method, apparatus and system shown and described has been characterized as being preferred it will be obvious that various changes and modifications may be made therein without departing from the spirit and the scope of the invention as defined in the following claims.

What is claimed is:

1. A system for providing a telecommunications service feature within a telecommunications switch having an erasable memory, wherein said telecommunications service feature is represented using a plurality of states and a plurality of variables and is provided by transiting from a current state to a next state, said system comprising:
 a task code software module comprising a plurality of executable instructions for providing said telecommunications feature which are organized into a plurality of tasks wherein executable instructions within each of said tasks perform a common function of said telecommunications feature and wherein each of said tasks is represented by an unique numerical value;
 a first table scored as data within said erasable memory and including pointers no lists of said unique task values, wherein a particular one of said pointers is indexed and retrieved from said first table by indexing via:
  a first numerical value representing a state said telecommunications feature is currently associated with;
  a second numerical value representing an event that was precipitated by said telecommunications switch; and
  a relational expression;
 a second table stored as data within said erasable memory and including said lists of task values; and
 a third table stored as data within said erasable memory and including a value representing a next state for a current state responsive to said indexing.

2. The system of claim 1 further comprising means for modifying the contents of one or more of said tables stored within said erasable memory in order to change the behavior of said telecommunications feature without recompiling said executable instructions.

3. The system of claim 1 wherein said first numerical value for representing a state within said first table further comprises:
- a wait state value for a state which is waiting for an event and transits from said current state to a next state using said first numerical value and said second numerical value; and
- a decision state value for a state which transits using said relational expression and said first numerical value.

4. The system of claim 1 wherein said relational expression comprises:
- a boolean variable representing one particular variable within said telecommunications feature which has the value of true or false;
- a boolean expression which has the overall value of true or false; and
- an indexing value used to index an array of pointers to lists of task values.

5. The system of claim 4 wherein said boolean expression comprises:
- a value representing a first variable;
- a value representing a second variable; and
- a boolean operator comparing said first variable value against second variable value, wherein said boolean operator comprises one of:
    - a<(less than) boolean operator;
    - a>(greater than) boolean operator;
    - a<=(less than equal to) boolean operator;
    - a>=(greater than equal to) boolean operator; and
    - an=(equal to) boolean operator.

6. The system of claim 4 wherein said indexing value is a case statement value.

7. A method of providing a telecommunications service feature within a telecommunications switch having an erasable memory, wherein said telecommunications service feature is represented using a plurality of states and variables, said method comprising the steps of:
- providing a plurality of executable program code groups, each of which contain a plurality of executable instructions for performing a common telecommunications function;
- providing a first table stored as data within said erasable memory which contains a plurality of lists of values wherein each value within each of said lists represents a particular one of said plurality of executable code groups;
- providing a second table stored as data within said erasable memory which contains a plurality of pointers wherein each pointer represents a particular one of said lists of values and is indexed and retrieved from said second table via:
    - a first value representing a state with which said telecommunications feature is currently associated;
    - a second value representing an event precipitated by said telecommunications switch; and
    - a relational expression representing a relational evaluation of at least one variable within said telecommunications feature; and providing a third table stored as data within said erasable memory and including a value representing a next state for the current state which is responsive to said indexing.

8. The method of claim 7 further comprising the step of modifying the contents of one or more of said tablet stored within said erasable memory in order to change the behavior of said telecommunications feature without recompiling said executable code groups.

9. The method of claim 7 wherein said step of providing said second table further comprises the steps of:
- defining a wait state waiting for an event and indexing using said first value and said second value to retrieve a particular one of said plurality of pointers; and
- defining a decision state indexing using said first value and an evaluation of said relational expression to retrieve a particular one of said plurality of pointers.

10. The method of claim 9 wherein said step of defining said decision state further comprises the steps of:
- defining a boolean variable representing a particular variable stored as data within said second table which has the value of true or false;
- defining a boolean expression which has the value of true or false; and
- defining an indexing value used to index an array of pointers to lists of group values.

11. The method of claim 10 wherein said step of defining said boolean expression further comprises the steps of:
- defining a value representing a first variable;
- defining a value representing a second variable;
- defining a boolean operator to compare said first variable value against said second variable value, wherein said boolean operator comprises one of:
    - a<(less than) boolean operator;
    - a>(greater than) boolean operator;
    - a<=(less than equal to) boolean operator;
    - a>=(greater than equal to) boolean operator; and
    - an=(equal to) boolean operator.

12. A system for providing a telecommunications service feature within a telecommunications switch having an erasable memory and a plurality of states, said feature being controlled by a kernel program which has executable task code, said system comprising:
- means for defining as data stored in a first table within said erasable memory for said feature the various states through which a call can transit and the relational expressions and events which precipitate those state transitions;
- means for defining as data snored in a second table within said erasable memory an array of lists of tasks, each list in said array specifying a sequence of tasks to be performed in association with that list;
- means for defining as data stored in a third table within said erasable memory for each given state an index to the next state to which the call should transition;
- means for executing said kernel program to access and analyze said first table, via the state, relational expression, and event indexes thereof, to determine which list of tasks within said second table is to be accessed;
- means for accessing said determined list of tasks and executing each of the tasks on said list in sequence; and
- means for accessing and analyzing said third table to access said next state.

13. The system of claim 12 further comprising means for modifying the contents of one or more of said tables in order to change the behavior of said telecommunications feature without recompiling said executable task code.

14. The system of claim 12 wherein said means for defining as data stored in said first table further comprises:

means for defining a wait state, said wait state waiting for a precipitating event and transiting through said various states from a current state associated with said feature in response to said precipitating event; and means for defining a decision state transiting through said various states from a current state associated with said feature in response to evaluation of said relational expression.

15. The system of claim 14 wherein said relational expression comprises:

a boolean variable representing one particular variable within said telecommunications feature which has the value of true or false;

a boolean expression which has the overall value of true or false; and an indexing value used to index an array of pointers to lists of task values.

16. The system of claim 15 wherein said boolean expression comprises:

a value representing a first variable;

a value representing a second variable; and a boolean operator comparing said first variable value against said second variable value, wherein said boolean operator comprising one of
a<(less than) boolean operator;
a>(greater than) boolean operator;
a<=(less than equal to) boolean operator;
a>=(greater than equal to) boolean operator; and
an=(equal to) boolean operator.

17. A system for providing a telecommunications service feature within a telecommunications switch having an erasable memory, wherein said telecommunications service feature is represented using a plurality of states and variables, said system comprising:

means for providing a plurality of executable code groups, each of said executable code group containing a plurality of executable instructions performing a common telecommunications function;

means for providing a first table stored as data within said erasable memory which contains a plurality of lists of values wherein each value within each of said lists represents a particular one of said plurality of executable code groups;

means for providing a second table stored as data within said erasable memory which contains a plurality of pointers wherein each pointer represents a particular one of said lists of values and each pointer is indexed and retrieved from said second table via:

a first value representing a state with which said telecommunications feature is currently associated;

a second value representing an event precipitated by said telecommunications switch; and a relational expression representing a relational evaluation of at least one variable within said telecommunications feature; and means providing a third table stored as data within said erasable memory and including a value representing a next state for the current state which is responsive to said indexing.

18. The system of claim 17 further comprising means for modifying the contents of one or more of said tables stored within said erasable memory in order to change the behavior of said telecommunications feature without recompiling said executable code groups.

19. The system of claim 17 wherein said means for providing said second table further comprises:

means for defining a wait state waiting for an event and indexing using said first value and said second value to retrieve one of said plurality of pointers; and means for defining a decision state indexing using said first value and said relational expression to retrieve one of said plurality of pointers.

20. The system of claim 19 wherein said means for defining said decision state further comprises:

means for defining a boolean variable representing a particular variable stored as data within said second table which has the value of true or false;

means for defining a boolean expression which has the overall value of true or false; and means for defining an indexing value used to index an array of pointers to lists of group values.

21. The system of claim 20 wherein said means for defining said boolean expression comprises:

means for defining a value representing a first variable;

means for defining a value representing a second variable; and means for defining a boolean operator to compare said first variable value against said second variable value, wherein said boolean operator comprises one of:
a<(less than) boolean operator;
a>(greater than) boolean operator;
a<=(less than equal to) boolean operator;
a>=(greater than equal to) boolean operator; and
an=(equal to) boolean operator.

* * * * *

UNITED STATES PATENT AND TRADEMARK OFFICE
CERTIFICATE OF CORRECTION

PATENT NO. : 5,740,236  Page 1 of 2
DATED : Apr. 14, 1998
INVENTOR(S) : Pruitt

It is certified that error appears in the above-identified patent and that said Letters Patent is hereby corrected as shown below:

| | |
|---|---|
| Column 2, line 45 | Replace "unit," <br> With --unit.-- |
| Column 5, line 22 | Replace "53-55;" <br> With --53-55,-- |
| Column 9, line 24 | Replace "Each." <br> With --Each-- |
| Column 9, line 62 | Replace "tasks:" <br> With --tasks-- |
| Column 13, line 52 | Replace "704;" <br> With --704,-- |
| Column 13, line 67 - <br> Column 14, line 1 | Replace "relational." <br> With --relational-- |
| Column 14, line 52 | Replace "scored" <br> With --stored-- |
| Column 14, line 53 | Replace "no" <br> With --to-- |

UNITED STATES PATENT AND TRADEMARK OFFICE
CERTIFICATE OF CORRECTION

PATENT NO.   : 5,740,236
DATED        : Apr. 14, 1998
INVENTOR(S)  : Pruitt

It is certified that error appears in the above-identified patent and that said Letters Patent is hereby corrected as shown below:

Column 15, line 29   Before "second"
                         Insert --said--

Column 16, line 2    Replace "tablet"
                         With --tables--

Column 16, line 46   Replace "snored"
                         With --stored--

Column 17, line 25   Replace "comprising"
                         With --comprises--

Signed and Sealed this

Twenty-fourth Day of August, 1999

Attest:

Q. TODD DICKINSON

*Attesting Officer*          *Acting Commissioner of Patents and Trademarks*